Patented Aug. 19, 1952

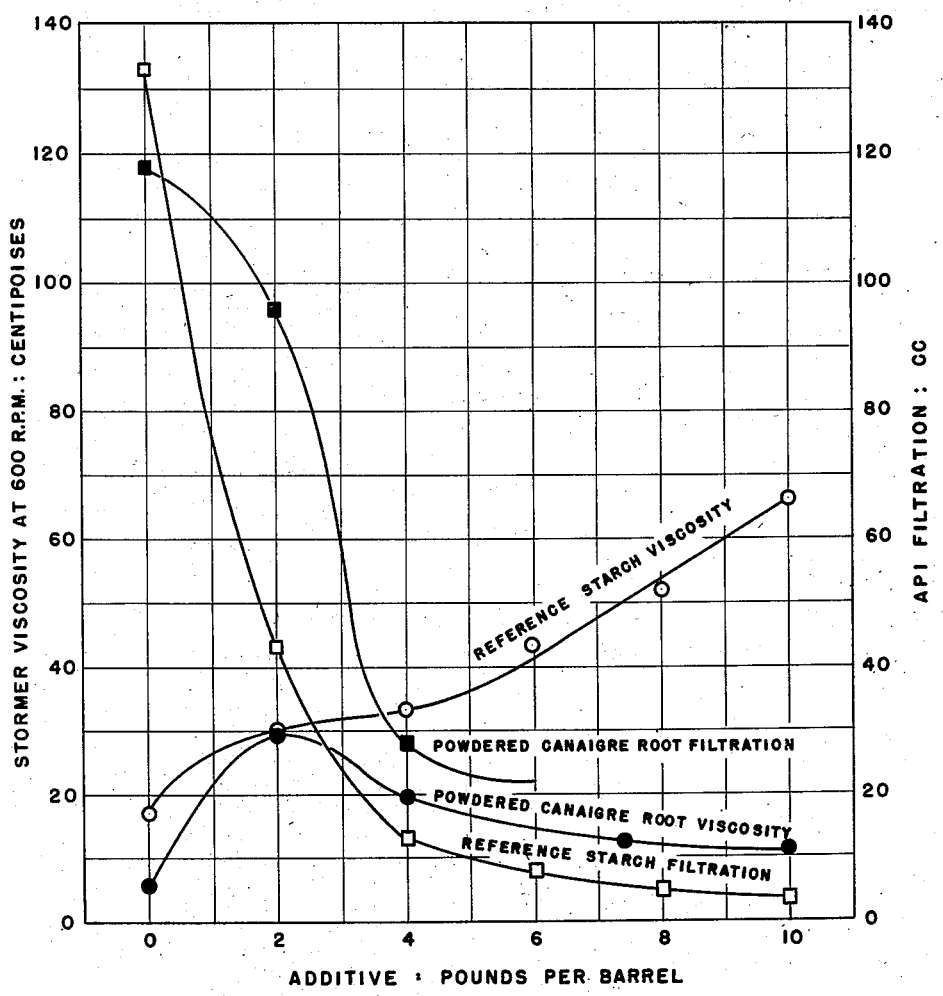
INVENTOR,
Douglas Ragland,
BY

2,607,730

UNITED STATES PATENT OFFICE 2,607,730

DRILLING FLUID FOR USE IN WELL-BORING OPERATIONS

Douglas Ragland, Houston, Tex., assignor, by mesne assignments, to Standard Oil Development Company, Elizabeth, N. J., a corporation of Delaware Application November 17, 1949, Serial No. 127,947

7 Claims. (Cl. 252—8.5)

The present invention is directed to an improved drilling fluid. More particularly, the invention is directed to a suspension of finely divided solids in aqueous medium which is suitable for employment in drilling of oil wells and the like.

In drilling wells and similar boreholes it has been common to use a drilling fluid or drilling mud which is circulated downwardly through a hollow drill stem and by issuing through a passageway in the drill bit serves to cool the drill bit. The drilling fluid then courses upwardly between the annulus of the drill pipe and the borehole and serves to carry the drilling cuttings to the earth's surface. The drilling mud or fluid also seals the sides of the drill or borehole and prevents loss of water and drilling fluids to formations traversed by the walls. In conducting such operations the drilling fluid may be passed through a settling tank or an earthen pit wherein sand and other cuttings may be separated out from the drilling fluid by screening and other separating devices. Finally the drilling fluid is again caused to resume its cycle down the drill stem and up the borehole.

In U. S. 2,109,858, patented March 1, 1938 in the name of George E. Cannon, drilling fluids containing tannic acid and caustic alkali were disclosed and claimed. The Cannon patent taught the efficacious nature of alkaline quebracho which allowed drilling through earth formations comprising heaving shale.

The art has developed considerably in the last decade whereas it is now known to add many materials such as barytes, iron oxide, magnetite, water soluble solids and polyphosphoric acids, sodium silicate, lignic acid and many other compounds too numerous to mention to drilling fluids to condition the drilling fluids for the several purposes enumerated hereinabove.

Many of the compounds enumerated above have the vice of not satisfying the various requirements of a drilling fluid. Thus, while one compound may serve to condition a drilling fluid for one peculiar property, another compound is necessary to condition the fluid to cause it to possess a still further property which may be necessary.

It is therefore the main object of the present invention to provide an improved drilling composition including a component which reduces both the filtration rate and the viscosity of a drilling mud.

Another object of the present invention is to provide an improved drilling mud which has a low filtration rate and low viscosity.

The objects of the present invention may be achieved by providing a composition including an aqueous suspension of finely divided solids to which has been added a mixture of an alkali metal hydroxide and pulverized or pulverulent canaigre root.

Accordingly, the present invention may be briefly described as involving a suspension of finely divided solids such as bentonitic and surface clays to which is added a mixture of an alkali metal hydroxide such as sodium hydroxide and pulverulent canaigre root, the mixture being present in the composition in the range between 2 and 10 pounds per 42 gallon barrel of the suspension. The alkali metal hydroxide and canaigre root are employed in the mixture in the preferred ratio of 1:1.

Canaigre root is found in the Southwestern part of the United States and has been known since the time of the early Spanish missionaries. It has been ascribed the scientific name of *Rumex hymenosepalis*. The canaigre root has been used extensively as a source of tannin, but prior to the present invention has not been used as a component of drilling mud.

The canaigre root employed in the practice of the present invention is obtained either from domestic or wild sources and before use in the present composition is shredded or macerated and reduced to a finely divided pulverulent form. In employing the powdered canaigre root it may be admixed with, in the dry state, bentonitic and/or surface clays such as encountered throughout Texas and other areas of the United States. To this admixture may also be added an amount of alkali metal hydroxide equivalent in weight to the amount of the canaigre root employed in the composition. The mixture of alkali metal hydroxide, canaigre root, and clay may then be admixed with water to form a suspension which is suitable for use as a drilling fluid.

To this suspension may be added various weighting materials such as barytes, iron oxide, barium sulfate, calcium carbonate and the like. The bentonitic clay employed in the practice of the present invention may contain small amounts of magnesium oxide or Portland cement.

The water employed in making up the suspension may be fresh or salt water. Usually a sufficient amount of water will be employed to provide a suspension prior to addition of weighting materials having a weight of approximately 10 pounds per gallon. In short, every gallon of water will contain approximately 1.7 pounds of finely divided solids, alkali metal hydroxide and canaigre root. If a heavier suspension is desired, one or a mixture of weighting materials mentioned heretofore will be added to the components of the composition.

The composition may also be made up by suspending finely divided solids such as bentonitic and surface clay in an aqueous medium such as fresh water or salt water and then adding thereto alkali metal hydroxide and canaigre root, the latter being in pulverulent form, and thoroughly admixing the suspension.

The alkali metal hydroxide employed in the present invention will be preferably sodium hydroxide in view of its economic availability, but it is to be understood that the other alkali metal hydroxides such as lithium, potassium and rubidium hydroxide may be used in lieu of the sodium hydroxide. While bentonitic clays and the surface clays mentioned before are preferred ingredients, it is also within the purview of my invention to employ Florida-Georgia kaolin such as available to the industry. In short, it is contemplated that my composition may include various clay and clay-like materials including the aluminum silicates and the sodium and calcium montmorillonites, and the like.

The invention will be illustrated further by reference to the drawing in which the single figure is a plot of data showing the relationship between Stormer viscosity at 600 R. P. M. and centipoises for additions to a suspension of various amounts of a mixture of caustic and powdered canaigre root. The drawing also shows the relationship between API filtration and the addition of various amounts of caustic and powdered canaigre root to the suspension.

In determining the efficiency of powdered canaigre root in admixture with caustic soda a suspension of finely divided solids such as a Florida-Georgia kaolin was made up with saturated salt water. The suspension to which the mixture of caustic and powdered canaigre root was added in varying amounts had a weight of approximately 10 pounds per gallon of suspension. To this suspension was added varying amounts of the canaigre root and the effect thereon on the viscosity and filtration was determined. To compare the results with a well known additive for drilling fluids, starch in varying amounts was added to the same drilling fluid and the viscosity and filtration of the drilling fluid to which starch was added was also determined. It will be apparent from the drawing that the starch reduced the filtration from approximately 133 centipoises down to approximately 5 on addition of 10 pounds per barrel thereof. It will be further apparent from the data that the filtration of the composition to which the canaigre root was added was reduced from approximately 118 down to approximately 22 on addition of 5% of the mixture of powdered canaigre root and caustic. While this is not as great a reduction as the starch in filtration rate, it will be seen that this result is wholly unexpected in view of the fact that reference to the viscosity curve shows that the canaigre root reduces the viscosity and also the filtration rate, whereas the starch while reducing the filtration rate causes an actual increase in viscosity.

It is highly desirable to have the filtration rate and the viscosity reduced at the same time since the filtration rate reduction prevents loss of water from the drilling mud, while the lowering of the viscosity allows the drilling mud to be pumped freely down the drill stem and up the borehole without excessive consumption of power.

The amount of canaigre root employed in the composition of the present invention may vary from about 2 to about 10 pounds per 42 gallon barrel of suspension. It will be preferred to use an amount in the range from about 4 to 8 pounds per 42 gallon barrel of suspension. The clays finding use in the practice of the present invention are surface clay such as frequently encountered at drilling sites in Texas. A quite useful clay in the present composition is an El Paso surface clay in admixture with bentonitic clay to which has been added a small amount of magnesium oxide or Portland cement. The clay solids in the suspension may vary from 15 to 20%.

The ratio of alkali metal hydroxide to powdered canaigre root is preferably 1:1, but may vary in the range from 0:1 to 4:1, depending upon the alkalinity of the drilling mud.

The nature and objects of the present invention having been completely described and illustrated, what I wish to claim as new and useful and to secure by Letters Patent is:

1. A composition comprising a suspension of finely divided solids in an aqueous medium and an amount of a 1:1 mixture of an alkali metal hydroxide and pulverulent canaigre root in the range between 2 and 10 pounds per 42 gallon barrel of said suspension.

2. A composition in accordance with claim 1 in which the finely divided solids are clay solids.

3. A composition comprising a suspension of finely divided solids in an aqueous medium having a weight of approximately 10 pounds per gallon and an amount of a 1:1 mixture of sodium hydroxide and pulverulent canaigre root in the range between 2 and 10 pounds per 42 gallon barrel of said suspension.

4. A composition in accordance with claim 3 in which the finely divided solids are clay solids.

5. A composition comprising a suspension of finely divided solids in an aqueous medium having a weight of approximately 10 pounds per gallon and approximately 6 pounds per 42 gallon barrel of said suspension of a 1:1 mixture of sodium hydroxide and pulverulent canaigre root.

6. A composition in accordance with claim 5 in which the finely divided solids are bentonitic clay and Texas surface clay.

7. A composition comprising a suspension of finely divided clay solids in an aqueous medium and an amount of a 1:4 mixture of sodium hydroxide and pulverulent canaigre root in the range between 2 and 10 pounds per 42 gallon barrel of said suspension.

DOUGLAS RAGLAND.

REFERENCES CITED

The following references are of record in the file of this patent:

UNITED STATES PATENTS

| Number | Name | Date |
|---|---|---|
| 1,999,766 | Lawton et al. | Apr. 30, 1935 |

OTHER REFERENCES

Webster's New International Dictionary, 2nd ed., unabridged, pub. 1941, by G. & C. Merriam Co. of Springfield, Mass., pg. 388, center col.

Stern: Role of Clay and Other Minerals in Oil-Well Drilling Fluids, Bureau of Mines Report of Investigations No. 3556, pg. 68, Feb. 1941.

Rogers and Russell: Canaigre Investigations, Article in the Journal of the American Leather Chemists Asso., vol. XXXIX, Dec. 1944, pgs. 467–479.

Rogers: Composition and Properties of Oil Well Drilling Fluids, 1st ed. pub. 1948, Gulf Pub. Co., Houston, Texas, pgs. 301 and 302.